United States Patent
Huang et al.

(10) Patent No.: US 12,411,666 B2
(45) Date of Patent: Sep. 9, 2025

(54) LOGGING APPLICATION PIPELINE ORCHESTRATION

(71) Applicant: Dell Products, L.P., Round Rock, TX (US)

(72) Inventors: Frank Yifan Huang, Shanghai (CN);
Gary Jialei Wu, Shanghai (CN);
Zhiyao Zhang, Shanghai (CN);
Weining Zou, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 210 days.

(21) Appl. No.: 17/727,535

(22) Filed: Apr. 22, 2022

(65) Prior Publication Data
US 2023/0342159 A1   Oct. 26, 2023

(51) Int. Cl.
| | |
|---|---|
| G06F 8/35 | (2018.01) |
| G06F 8/36 | (2018.01) |
| G06F 8/65 | (2018.01) |
| G06F 9/38 | (2018.01) |
| G06F 11/30 | (2006.01) |
| G06F 11/34 | (2006.01) |
| G06F 9/48 | (2006.01) |
| G06F 9/50 | (2006.01) |

(Continued)

(52) U.S. Cl.
CPC ............ *G06F 8/35* (2013.01); *G06F 8/36* (2013.01); *G06F 8/65* (2013.01); *G06F 9/3858* (2023.08); *G06F 9/3869* (2013.01); *G06F 11/3079* (2013.01); *G06F 11/3476* (2013.01); *G06F 9/3867* (2013.01); *G06F 9/4843* (2013.01); *G06F 9/5022* (2013.01); *G06F 12/0253* (2013.01); *G06N 20/00* (2019.01); *H04L 41/5054* (2013.01)

(58) Field of Classification Search
CPC ..... G06N 20/00; H04L 41/22; H04L 41/5054; G06F 8/71; G06F 9/3867; G06F 12/0253; G06F 9/5022; G06F 8/10; G06F 9/4843; G06F 8/60; G06F 8/35; G06Q 10/0633; G06Q 30/02; G06Q 30/0635
See application file for complete search history.

(56) References Cited

U.S. PATENT DOCUMENTS

| | | | | |
|---|---|---|---|---|
| 11,343,142 | B1 * | 5/2022 | Wang | G06F 9/3867 |
| 2019/0052549 | A1 * | 2/2019 | Duggal | G06Q 30/0635 |

(Continued)

OTHER PUBLICATIONS

Meng et al., CN 108574712, (translation), Jun. 1, 2021, 10 pgs <CN_108574712.pdf>.*

(Continued)

*Primary Examiner* — Tuan A Vu
(74) *Attorney, Agent, or Firm* — Amin, Turocy & Watson, LLP

(57) ABSTRACT

A user interface facilitates a user designing one or more logging pipelines that may run concurrently on a computer system for logging information relative to one or more respective application. Custom object instances that run in a POD facilitate translating the applications' formats, protocols, and rules for use by generic logging function components selected by the user when designing the pipelines. The custom object instances facilitate updates to a given pipeline being implemented without affecting other active pipelines that are logging application activity.

20 Claims, 10 Drawing Sheets

(51) Int. Cl.
*G06F 12/02* (2006.01)
*G06N 20/00* (2019.01)
*H04L 41/5054* (2022.01)

(56) References Cited

U.S. PATENT DOCUMENTS

| | | | | |
|---|---|---|---|---|
| 2022/0138004 | A1* | 5/2022 | Nandakumar | G06N 20/00 |
| | | | | 718/102 |
| 2022/0326983 | A1* | 10/2022 | Kutik | G06F 9/4843 |
| 2022/0353201 | A1* | 11/2022 | Navali | H04L 41/5054 |
| 2022/0365851 | A1* | 11/2022 | Simon | G06F 12/0253 |
| 2022/0405092 | A1* | 12/2022 | Miedema | G06F 8/60 |
| 2023/0054760 | A1* | 2/2023 | Kiselev | G06F 8/10 |
| 2023/0126045 | A1* | 4/2023 | Pan | G06F 9/5022 |
| | | | | 718/104 |

OTHER PUBLICATIONS

"Logstash" [https://www.elastic.co/logstash/] retrieved Jan. 12, 2024, 11 pages.

"kube-apiserver" [https://kubernetes.io/docs/reference/command-line-tools-reference/kube-apiserver/] retrieved Jan. 12, 2024, 18 pages.

"CustomResourceDefinitions" https://kubernetes.io/docs/concepts/extend-kubernetes/api-extension/custom-resources/#customresourcedefinitions, retrieved Jan. 12, 2024, 8 pages.

"etcd" [https://etcd.io/] retrieved Jan. 12, 2024, 3 pages.

"Grafana Loki" [https://grafana.com/oss/loki/] retrieved Jan. 12, 2024, 14 pages.

"Elastic Stack" [https://www.elastic.co/elastic-stack/] retrieved Jan. 12, 2024, 8 pages.

"Extract, transform, load" [https://en.wikipedia.org/wiki/Extract,_transform,_load] retrieved Jan. 12, 2024, 9 pages.

"Kubernetes" [https://en.wikipedia.org/wiki/Kubernetes] retrieved Jan. 12, 2024, 21 pages.

"fluentd" [https://www.fluentd.org/] retrieved Jan. 12, 2024, 5 pages.

"fluentbit" [https://fluentbit.io/] retrieved Jan. 12, 2024, 4 pages.

"rsyslog" [https://www.rsyslog.com/] retrieved Jan. 12, 2024, 8 pages.

* cited by examiner

LOGGING APPLICATION PIPELINE ORCHESTRATION

BACKGROUND

Logging functionality is used in computer application instances, including mainframe, client/server, and cloud-native ones, and for computer infrastructures running from a network edge to core components of a network. Computer data logs are used for trouble shooting and can strengthen observation and insight into system operation and performance. In a containerized system development, such as operated by an enterprise or at a data center, development-operations personnel or departments collect logs from multiple system components where the logs are generated, and move, process, and organize the logs or log information, into a centralized place for further usages such as trouble shooting, searching, and analyzing. This process may be known as an extract, transform, and load ("ETL") process. Because enterprises or data center operators may facilitate and support multiple or different types, varieties, or versions of applications and application systems, designing, maintaining, and performing ETL processes for different applications involves manually creating multiple corresponding logging processes, which may be organized as pipeline architectures, with a logging pipeline for one application potentially being different from a logging pipeline architecture for another application. Computer professionals typically manually create a separate logging pipeline architecture for a given application and manually create a separate logging pipeline architecture for another application.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method uses a user interface to allow personnel to create, or orchestrate, logging processing pipelines. Multiple log pipelines may be generated to manage logs for each of a plurality of different applications, which could be running on different platforms or operating systems, without a user that creates or uses the log pipeline, or logs themselves, needing to know specifically design a given log pipeline for each disparate application. Thus, computer system or application infrastructure details, application-specific logging components details, and log analytics systems are automatically generated such that logging pipeline creation, operation, and administration occur 'behind the scenes' and personnel can focus on designing logging pipeline components for a given application without having to focus on how to design a particular logging pipeline component for specific applications or computer systems.

In an example embodiment, aa method comprises receiving, by a system comprising a processor via a user interface, a first pipeline component configuration design, corresponding to a first pipeline, that comprises a first set of component selections. The system may be a computer system operated by an enterprise, or may be a component, whether software, hardware, firmware, a container, and instance, or other type of computer component or subcomponent. The method may comprise receiving, by the system via the user interface, a second pipeline component configuration design, corresponding to a second pipeline, that comprises a second set of component selections. The components of the pipeline designs may be generic functions selected by a user that are application agnostic. The embodiment method may comprise retrieving, by the system from an application and platform component data store, a set of pipeline configuration component definitions that correspond to a set of components of the first set of component selections or the second set of component selections. The application and platform data store may comprise a Kubernetes etcd data store. Based on the set of pipeline component definitions, the method may comprise generating, by the system, at least one custom object corresponding to at least one of the first pipeline component configuration design or the second pipeline component configuration design, wherein the at least one custom object is configured to perform at least one computer function that corresponds to the at least one of the first pipeline component configuration design or the second pipeline component configuration design. The custom objects may be computer instances and may be implemented in Kubernetes custom resource definition instances.

In an embodiment, the first pipeline component configuration design or the second pipeline component configuration design comprises a logging function component, which may be referred to herein as a plugin, or function.

In an embodiment, at least one of the first pipeline component configuration design or the second pipeline component configuration design may comprise at least one function selected from a group of functions, which functions may comprise: a parsing function, a multiline recognition function, a filtering function, a metadata enrichment function, a routing function, an external forwarding function, and a log retention function.

In an embodiment, the first pipeline and the second pipeline are implemented with a computer platform management software system. In an embodiment, the computer platform management software may comprise Kubernetes functionality.

In an embodiment, the at least one custom object comprises instructions usable to perform the at least one computer function that corresponds to the at least one of the first pipeline component configuration design or the second pipeline component configuration design. The functions may be logging functions.

In an embodiment, the first pipeline component configuration design may correspond to a first computer application and the second pipeline component configuration design may correspond to a second computer application, and the second computer application may be a different computer application than the first computer application.

In an embodiment, the first pipeline and the second pipeline are configured to concurrently generate respective logging information corresponding to concurrent operation of the first application and the second application. Thus, a single complicated pipeline does not need to be devise in an attempt to log activity related to more than one application.

In an embodiment, the first pipeline component configuration design or the second pipeline component configuration design may comprise an update usable to modify the first pipeline component configuration design or second pipeline component configuration design, respectively, resulting in an updated first pipeline or an updated second pipeline, respectively, and wherein a restart of a computer environment, in which the updated first pipeline or the updated second pipeline is operating, does not occur before operation of the updated first pipeline or the updated second pipeline, respectively, begins. Other pipelines that may be running can continue to run without the update affecting their operation, and in an embodiment the application to which the updated pipeline corresponds can continue to operate while the related pipeline is being updated and begins to operate.

In yet another embodiment, a system comprises a device comprising a processor to that may be configured to receive, from a user interface, a first pipeline component configuration design that comprises a first set of component selections and receive, from the user interface, a second pipeline component configuration design that comprises a second set of component selections. The processor may be further configured to retrieve, from an application and platform component data store, which may be an etcd data store a set of pipeline configuration component definitions that correspond to a set of components of the first set of component selections or the second set of component selections. The processor may be further configured to generate a set of custom objects, or custom object instances, corresponding to at least one of the first pipeline component configuration design or the second pipeline component configuration design based on the set of pipeline component definitions, wherein the set of custom objects is configured to cause performance of a set of computing functions that correspond to the at least one of the first pipeline component configuration design or the second pipeline component configuration design. The custom object instances may comprise Kubernetes custom resource definitions that act as interfaces between raw information provided to from computer system logging components and pipeline components that a user has generically selected to form a pipeline configuration corresponding to a given application, for example.

In an embodiment, the first pipeline component configuration design or the second pipeline component configuration design comprises logging function components. The set of custom objects may comprise instructions to cause performing of the one or more computing functions that correspond to the at least one of the first pipeline component configuration design or the second pipeline component configuration design.

In an embodiment, the first pipeline component configuration design may correspond to a first application and the second pipeline component configuration design correspond may correspond to a second application, and the second application may be a different application than the first application.

In an embodiment, a first pipeline and a second pipeline, corresponding to the first pipeline component configuration design and the second pipeline component configuration design, respectively, are configured to concurrently generate logging information corresponding to concurrent operation of the first application and the second application, respectively. In other words, more than one pipeline configuration can operate at the same time another pipeline operates. This feature may be facilitated by storing state information relative to custom object instances in an etcd data store such that one pipeline need not be disabled for another pipeline to process data. Multiple pipelines can correspond to different respective application, or in an embodiment multiple pipelines can run concurrently, or simultaneously, and process logs for the same application.

In an embodiment, a design of the first pipeline component configuration design or the second pipeline component configuration design may comprise an update, wherein the update corresponds to the design of the first pipeline component configuration design or the second pipeline component configuration design, and wherein the update may result in an updated design of the first pipeline component configuration design or the second pipeline component configuration design, respectively, and wherein a restart of a computing environment, to which the updated first pipeline component configuration design or the updated second pipeline component configuration design is applicable, does not occur before the updated pipeline begins operating according to the updated pipeline component configuration design. As previously mentioned, using Kubernetes custom resource design functionality may facilitate the feature of not requiring a system restart, or at least an application restart, before a new pipeline configuration can become operational.

In an embodiment, a non-transitory machine-readable medium, may comprise executable instructions that, when executed by a processor, facilitate performance of operations, which operations may comprise monitoring, with an operator service instance, operation of one or more custom objects. The operator service instance may be referred to herein as a logging operator, or an operator. The operator service instance may be implemented with a controller manager, such as a Kubernetes controller manager. The operations of the embodiment may comprise changing, with the operator service instance, at least one of the one or more custom objects according to changes in an application that corresponds to user-selected pipeline component functionality, and may comprise translating, with the one or more custom objects, or custom object instances, application information related to the application into translated application information according to the user-selected pipeline component functionality. The operations of the embodiment may comprise performing operations on the translated application information according to the user-selected pipeline component functionality. The translated information may be raw information that is retrieved from, or received from, logging components that are part of a computer system and that have been processed by custom object instances to implement a pipeline configuration that was generically specified by a user who was not required to know, or provide, specific information such as parameters, formats, or rules that an application requires to obtain logging information from it.

In an embodiment, the creation of the pipeline component functionality may comprise: receiving, from a user interface, a pipeline component configuration design that comprises one or more component selections; retrieving, from an application and platform component database, one or more pipeline configuration component definitions that correspond to one or more components of the one or more component selections; generating the one or more custom object instances corresponding to the pipeline component configuration design based on the one or more pipeline component definitions, and wherein the one or more custom object instances are configured to perform one or more functions that correspond to the pipeline component configuration design.

The pipeline configuration may comprise a logging component. The one or more custom objects may run in a computing environment, such as a Kubernetes POD.

In an embodiment, the pipeline configuration may be updated to an updated pipeline configuration, and wherein the computing environment, in which the pipeline configuration operates, is not restarted before the updated pipeline configuration begins operation. The update to the pipeline configuration may make changes to include more, less, or different pipeline components/functions/plugins.

DETAILED DESCRIPTION

Figure 1:
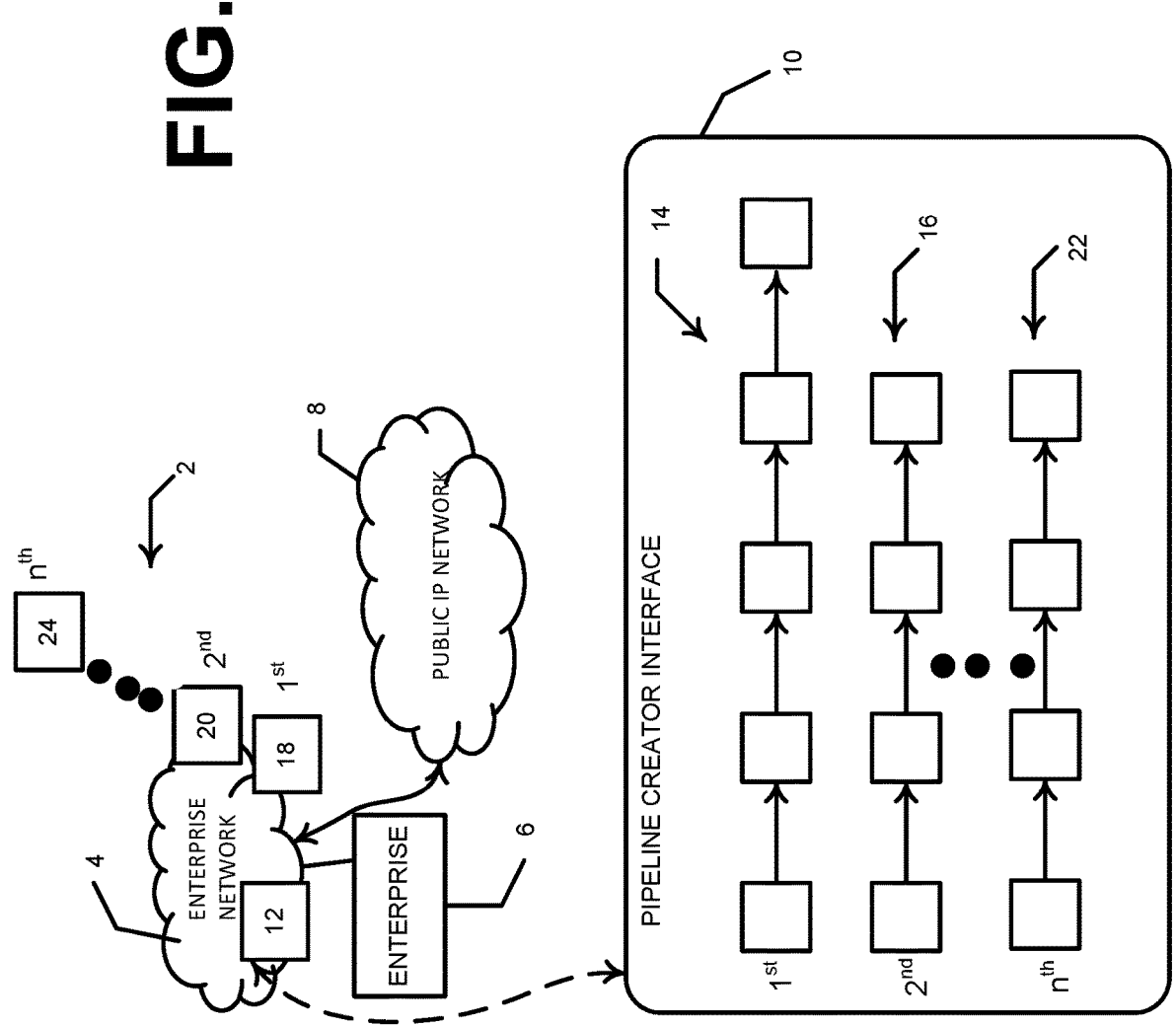
FIG. 1 illustrates a diagram of a computer system and network.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is only illustrative and exemplary of one or more concepts expressed by the various embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

A logging computer service manages log lifecycle management with a user-friendly, configurable interface. The logging service may facilitate system and application administrators perform centralized log management, processing, log rotation and exporting, among other tasks. Logging of computer events may facilitate analyzing computer system or computer network events for purposes of identifying intrusion attempts, whether successful or not. In addition, logging may facilitate an enterprise in auditing and compliance, for example legal chain of custody of documents or review thereof, as well as being an example of a best practice of basic computer systems and application management. Although sometimes described in varying terms, a log management process has a few basic lifecycle portions, including policy definition, configuration, collection, normalization, indexing, storage, correlation, baselining, alerting, and reporting. A pipeline is a way of describing the lifecycle of logs in an abstracted way. A pipeline typically includes a few basic elements. One pipeline element may be a Source, such as device, application, instance, or other computer function that generates, collects, or assembles computer event information. For example, a container can provide its logs to a local mount path or to a standard output. A 'Standard Output' may be a pipe connecting commands with the an operating system shell such that within the shell a Text output stream may be delivered from commands to the shell In Linux, and Unix-like, operating systems, for example.

Log information processing elements, or components may be visualized, and logically implemented, as plugins, which may be chained to one another in series or in parallel, and which define, or implement functions of, various ETL processing of logs. Typical plugins may include parsers, enrichments and modifier plugins, format transformers, and filters.

Output elements may define one or more destinations where logs may be stored for long-term persisting and analyzing. For example, an output element could be a persistent file volume, a message queue, or an external database.

Embodiments described herein facilitate integrating logging pipelines that may comprise different open-source logging processing elements, or components, which may be referred to as plug-ins that perform a predefined function. A user interface, and computer-implemented methods or systems that facilitate the interface, provides a high-level, source-agnostic, application-agnostic, universal, unified way to describe the behavior of each pipeline plug-in component using generic functional terms. Thus, multiple different components may be integrated together to create a working pipeline by translating user-specified pipeline design components that the user may specify in terms of generic functional component blocks into pipeline component blocks that may require different languages (e.g., different data formats, different data protocols, different processing protocols, etc.).

Different computer applications, including system applications, may have different requirements as to how their logs are collected, ETL processes are performed thereon, are monitored, or are analyzed. Aspects that may differ between applications include, but are not limited to, the following functions that are described at a high level.

Parsing: A process or function in which an application may perform processing to extract usable information from raw log content for further usage such as performing searching or compiling statistics.

Multiline recognition: This functionality may combine multiple continuous lines of logs that logically belong to, or relate to, or should compose log event or a single log entry. Applications typically have different log formats that can result in different recognition patterns of multiline logs from one application to a different application.

Filtering: Logs from different applications may have different rules to filter out logs that may not be useful for persisting, further processing, or exporting.

Metadata enrichment: Logs can be enriched to include extra metadata, such as, for example, Kubernetes metadata gets from a Kubernetes API Server or user metadata generated from custom logic.

Routing: Logs from different computer components or software instances can have different pipelines defined to differentiate the usage of the log Information.

External forwarding: Applications may have different requirements for the forwarding of their logs to external systems for further analyze.

Log retention: Applications may have their own retention policies for their logs, based on needs of the applications.

From time to time, and administrator/IT personnel, may desire to update a currently running pipeline. In such a scenario, it is desirable that pipeline continue functioning without a service interruption or outage. Moreover, it is desirable that a change, or an update, to a given application pipeline should not impact other pipelines. Thus, the logging service described herein provides for dynamically designing/creating a new pipeline, or updating an existing pipeline, without restarting of a logging component, or without performing a refresh to common policies of a component, that could possibly impact, or even disable other currently running pipelines.

One or more of the embodiments described herein provide multiple benefits compared to having to create and run a pipeline for a given first application and then having to create and run a different pipeline for a different application while discontinuing running of the pipeline for the first application. For example, multiple pipelines can be designed, implemented, and run concurrently instead of only a single hard coded pipeline running in a given computer environment, for example a group of containers, such as a POD in a Kubernetes environment. Instead of only a single pipeline running in a POD environment, where the single pipeline may be only a global pipeline that does not differentiate differing formats, protocols, or requirements from one application to the next, multiple different pipelines may be designed any may run concurrently for multiple applications running in a given computer environment, such as a POD. Some of the differing needs from application to application that multiple concurrent logging pipelines may process may include different processing steps or different destinations to persist and analyze logging data. Embodiments described herein facilitate the designing, creating, and concurrently running of more than one logging pipeline where each one applies to a different application than one or more of the other pipelines.

In embodiments described herein, pipeline configurations are not unchangeably bound to comprise specific logging components. Even when a pipeline is configured to apply to a given software application the software may be updated to a new version that may bring with it new data formats, new processing protocols, or new storage requirements, for example. A given pipeline design as described herein may be updated to accommodate a revised software version, even if the application is the same basic application without affecting other concurrently running pipelines and without having to restart other components of the logging pipeline that may still apply to the revised software application. For example, for a given pipeline configuration if an output logging component needs to be revised a parsing component in the same pipeline may continue to operate while the new output component is being designed and being brought into the pipeline.

Another advantage of embodiments described herein is that parameters for a given pipeline component are not hard coded in chart values. Instead of trying to design a single logging pipeline to deploy for use with a plurality of different applications, which is usually not suitable for a platform serving multi-applications, or even if such a pipeline could be designed to work would likely not be optimal for any of the application, embodiments described herein facilitate defining different parsers, filters, input/output routes in different logging pipelines for different applications.

Another advantage is that a given logging pipeline component can be redesigned to a new specification or new rules configuration without having to restart the computer environment in which the pipeline is running (e.g., without having to restart a Kubernetes POD).

Another advantage of embodiments described herein is the providing of a user-friendly interface to design and configure a logging pipeline and components thereof. Administrators do not need to know details about specific logging software or manually modify data thereof, such as data related to Kubernetes Configmaps or Secrets. Rather, the user interface facilitate a user selecting one or more generic logging pipeline components, for example a parsing component or function, and the user interface works with a data base that stores therein parameters for a given application that the user has specified with the user interface, facilitates the retrieving of the parameters, or other requirements specific to the application that would be useful for a parsing function, and facilitates the creating of a logging pipeline parser component that complies with, and interoperates with, the specified application without the user having to specify, or manually enter, parameter or rule information to create a parser component and make it part of a pipeline configuration.

Pipelines may be abstracted, for example using Kubernetes Custom resource Definitions ("CRD") or similar custom objects or instances, to describe inputs, flows and outputs of logs per application, and utilize a customized controller manager, which may be referred to as a 'logging operator', to automate the processes of adopting, interacting with, interfacing with, or implementing, components and their configurations. The controller manager may be a computer process, such as a Kubernetes process, that manages controllers. A controller may be referred to as a reconciliation loop that communicates with an API server to manage resources such as PODs or endpoints. A replication controller may run a defined number of PODs, including replacement PODs if a current POD fails.

Pipelines created using an interface and related system as described can facilitate applications processing data flows related and logs thereof according to unique rules associated with the applications. Such pipelines can be created without requiring application administrators to have knowledge of an application's, or applications', specific rules for generating logging components. Users can create different pipelines for different log sources to facilitate logs being processed according to a custom, abstract way as designed by an administrator/user.

Turning now to the figures, FIG. 1 illustrates a diagram of a computer system 2. In the embodiment illustrated, which illustration may depict a system having a private enterprise network 4 operated by an enterprise 6, to which may have multiple computer devices connected physically or logically to network 4. Network 4 may interconnect with a public network 8, such as a public Internet Protocol network like the Internet. A user, who may be an employee of enterprise 6, such as an Information Technology administrator, may use a user interface 10 to design or modify logging pipelines that process data related to computer activity within, or with, computer devices that make up network 4. Pipeline management server 12 may host, or provide, user interface 10 and may implement pipeline configuration designs created with the user interface.

A user may create, or design, a first pipeline configuration design 14 and a second pipeline 16, corresponding to first application 18 and second application 20, respectively. A user using interface 10 selects one or more logging pipeline components to design pipeline 14 by selecting from a plurality of generic pipeline components. The same user, or a different user, may also design pipeline 16 by selecting the same components as selected for the first pipeline configuration. Or, the user may select different, more, or fewer, pipeline components as selected for the first pipeline 14. The user does not need to know or understand parameters of applications 18 or 20, but only selects the pipeline components he, or she, wants to use to design pipeline configuration designs 14 or 16, respectively. Pipeline management server 12, or one or more applications running thereon, may translate the selected generic pipeline components (shown as blocks composing first pipeline 14 and second pipeline 16) into function that can perform logging of activity related to applications 18 and 20 based on information stored in a database, that may be part of the pipeline management server, or may be part of a different component that is part of network 4, or that may be logically part of public network 8. The information stored in the database may associate logging functionality for a given generic pipeline component with specific rules for interoperating with, or interacting with, or using data related to, applications 18 and 20 even if the applications are different. The figure illustrates a $n^{th}$ pipeline configuration design 22 and an $n^{th}$ application 24 to show that more than two logging pipelines can be designed for more than just two corresponding applications; two applications and two corresponding pipelines are shown and described for purposes of clarity.

Figure 2:
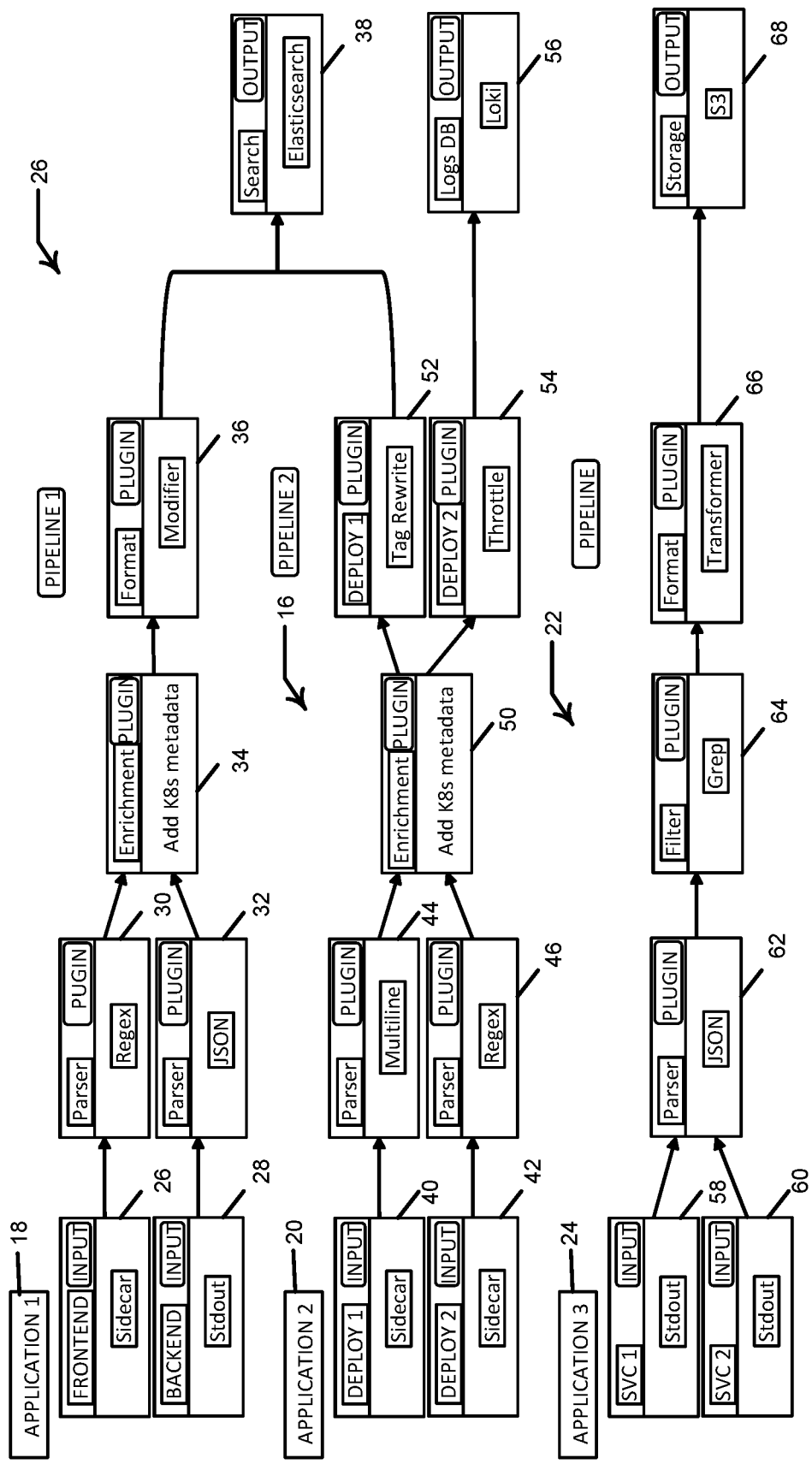
FIG. 2 illustrates a pipeline configuration design.

Turning now to FIG. 2, the figure illustrates a pipeline configuration design 26 that may be displayed in user interface 10 shown in FIG. 1. For purposes of discussion the terms 'pipeline configuration', 'pipeline configuration design', and 'pipeline' may be used in reference to discussing FIG. 2 and pipeline designs shown therein, or to other embodiments discussed herein, but generally 'pipeline configuration design' is meant to refer to the design of pipeline functional components that a user creates using interface 10 and 'pipeline configuration', or merely 'pipeline' is meant to refer to the implementation in a computer 'space' or environment, by computer software code, firmware, hardware, or other form of computer logic that corresponds to, performs, or causes the performing of, the design components' functionality. Accordingly, a pipeline configuration 'design' component, such as a parser, may refer to the generic functionality that a user may select as he, or she, 'builds' a pipeline using interface 10, while a pipeline configuration component may refer to the implementing by a computer device of the functionality of the design component according to rules corresponding to an application to which the user who selected the pipeline design component wants the component's functionality to apply.

Continuing with discussion of FIG. 2, first pipeline design 14 is created to perform logging for activity related to first application 18, second pipeline design 116 is created to perform logging for activity related to second application 18, and third pipeline design 22 is created to perform logging for activity related to third application 24. It will be appreciated that in the description of FIG. 1 pipeline design 22 is referred to as the $n^{th}$ pipeline design and application 24 is referred to as the $n^{th}$ application. FIG. 2 shows three applications and three corresponding pipeline design, and thus, the $3^{rd}$ application and the 3rd pipeline design are the nth application and nth pipeline design, respectively, in the embodiment shown in FIG. 2. In the embodiment shown in FIG. 2, each of first application 18, second application 20, and third application 24 may be different applications from one another.

First pipeline design 14, which corresponds to first application 18, includes a front end component 26 and back end component 28, which feed into parser component 30 and parser component 32, respectively, both of which feed into enrichment component 34, which feeds into format component 26, which feeds into output component 38. Second pipeline 16 corresponds to second application 20. Second pipeline 16 includes deployment input component 40 and deployment input component 42. Input component 40 feeds into parser component 44 and input component 42 feeds into second parser component 46. Parser 44 and parser 46 feed into enrichment component 50, which has an output that splits into tag rewrite component 52 and throttling component 54. Tag rewrite component 52 joins with the output of formatting component 26 of first pipeline 14 and provides an output to output component 38. Throttling component 54 feeds into output component 56. Third pipeline 22 corresponds to, and processes activity related to, third application 24. Third pipeline 22 comprises first services input 58 component and second services input component 60, both of which feed into parser component 62. Parser component 62 feeds into filter component 64, which feeds into formatting component 66 which feeds into storage output component 68. The components shown in FIG. 2 are shown as examples. It will be appreciated that components other than the ones shown in FIG. 2 may be selected for use in building a given pipeline, including a number of components specified/used, types of components specified/used, or connections of components specified for the pipeline configuration.

Pipeline management server 12, as described above in reference to FIG. 1, may facilitate users in designing, or creating, one or more pipeline configurations. Pipeline management server 12 may facilitate computer administrator personnel perform Create, Read, Update, and Delete ("CRUD") operations to data via a restful API. Via a user interface, interface 10 as shown in FIG. 1 for example, an administrator may only fill in on a screen using one or more input techniques (drop-down box, text box, radio button, and the like), or otherwise provide, parameters in selecting generic plugins, or pipeline components, to a resultful API or similar interface, for example. As mentioned above, examples of logging components, or plugins include inputs, parsers, outputs, enhancers, etc. Not only can a user select logging pipeline components to use in a pipeline design, but the user may also define the order of those pipeline components, or plugins. The restful API may translate the selections made by a user into components that are implemented to log computer activity of network 4 as shown in FIG. 1. As shown in FIG. 2, at the head of the pipeline is input, on the tail of pipeline is output, and between the input and output are logging pipeline components selected, or selectable, by an administrator, or other type of user.

Instead of a self-installed local database that stores pipeline information, a distributed key-value store, such as an etcd data store, which Kubernetes may implement, stores pipeline information, such as the current state of a computer system or parts of the computer system. The distributed key store may also store information related to protocols associated with operation one a given computer application. End users can also create components other than pipeline components, such as template log formats for use with output components, or plugins, information about which, and the states of which, may be stored in an etcd data store.

After a user designs a pipeline, for example by using interface 10 as described in reference to FIG. 1, management server 12 may transfer those pipelines into one or more custom objects, for example Kubernetes CRD instances. The custom objects can facilitate a given pipeline configuration dynamically changing without having to restart an environment in which the CRD custom objects, or instances, are running.

A pipeline may be composed of several components, or plugins. Some examples of components/plugins include the following.

Input components/plugins may be used to define the source of a log, including the source type, location, and other information so that a logging service can know from where to collect the log information.

Parser components/plugins may parse log messages to extract predetermined attributes and information that may be useful for latter log processing a specified by an administrator designing a logging pipeline.

Filter components/plugins may filter logs according to attributes, file names, or other labels/fields.

Format components/plugins may make changes to a log message based on attributes, file names, or other labels/fields.

Enrichment components/plugins may add useful information to log messages, such as Kubernetes metadata.

Output components/plugins may define a destination to which logs are to be sent or stored. End users may specify storage of logs in a local data store or may select to use other outside logging systems, such as, for example, Loki, Elasticsearch, or equivalent systems, or external storage systems.

Figure 3:
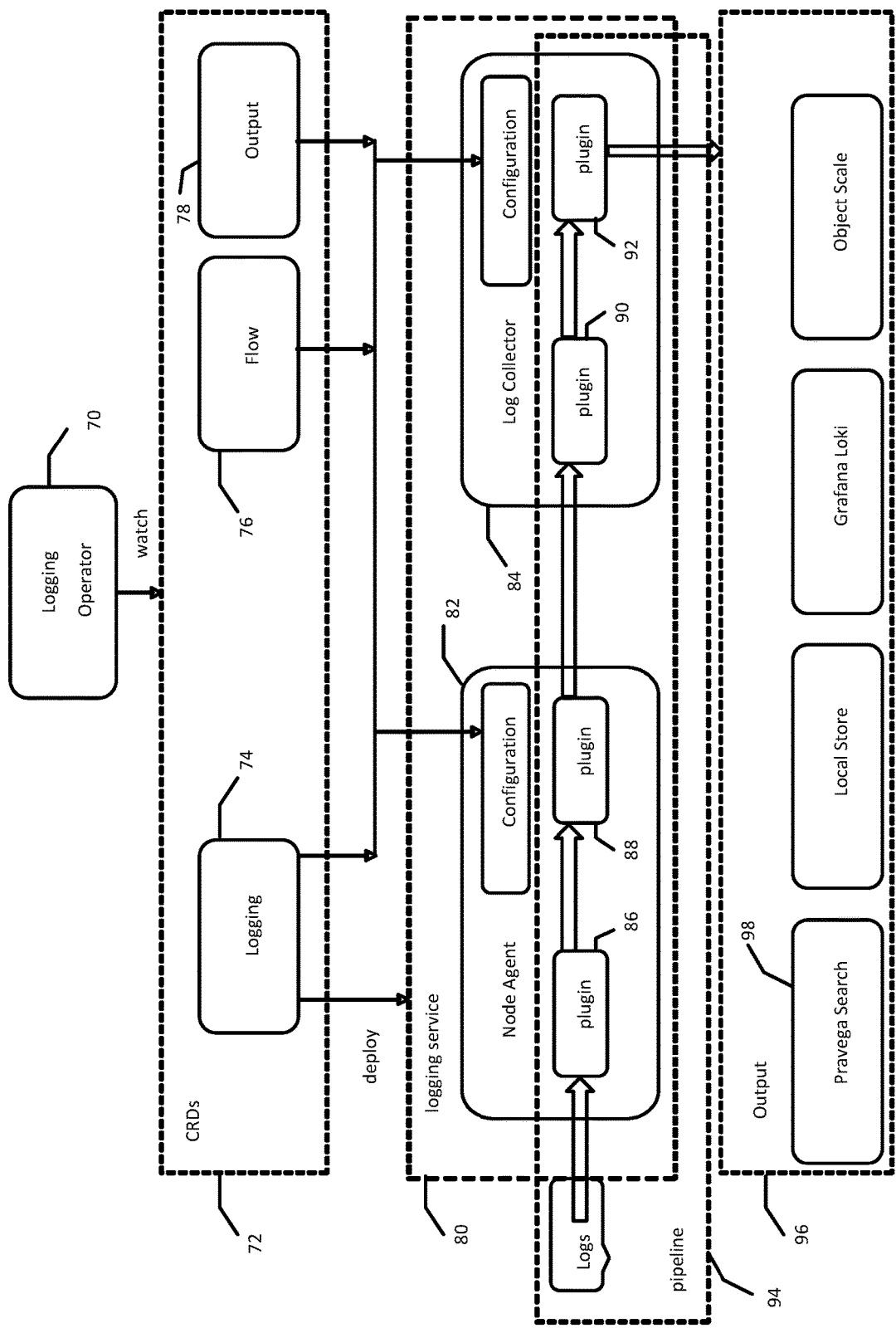
FIG. 3 illustrates a diagram of a system that implements logging.

Turning now to FIG. 3, the figure illustrates a diagram of a system that implements logging using custom objects that corresponds to one or more pipeline design configurations. Logging operator 70 and one or more custom logging object instance 72, which may be Kubernetes CRD instances, may interoperate to dynamically configure and implement a pipeline configuration designed by a user. Logging operator 70 may implemented with a controller manager. Examples of custom logging object instances include a logging object 74, a flow object 76, and an output object 78. Logging operator 70 may facilitate building logging service 80. Logging service 80 is shown including node agent 82 and log collector 84. Node agent 82 includes pipeline component/plugin 86 and pipeline component/plugin 88. Log collector 84 includes pipeline component/plugin 90 and pipeline component/plugin 92. Logging information processed according to pipeline configuration 94, which may comprise functions arranged according to pipeline components selected by a user using a under interface, such as interface 10 shown in FIG. 1, may be provided to output function 96.

CRDs 72 may start as predefined default CRDs such that logging operator 70 can load them and apply a configuration, which may be a default configuration. When a specific software application or a specific software version that has been associated with logging components, such as plugins 86, 88, 90, or 92, changes, corresponding CRDs can be changed accordingly. Logging operator 70 can automatically reload the individual changed CRDs and makes the changes without affecting unchanged CRDs or without affecting one or more computer environments in which they are implemented. Not only can CRDs be revised to accommodate application software changes, the configuration of pipeline configuration 94 can be dynamically configured via logging operator 70 and CRDs 72. Logging operator 70 may dynamically implement a user's, or users', initial designs, or revised designs, made through user interface 10 via pipeline management server 12, by mapping the changes to CRDs such that the CRDs provide data to be used by logging service 80 in accordance with formats, protocols, or rules that match log information for a given application with the user's, or users', desired functionality as specified by pipeline components arranged, or configured according to pipeline configuration 94. One or more corresponding logging components' PODs do not need to be restarted for configuration changes or updates to take effect. As shown in FIG. 3, logging operator 70 watches computer activity for a given computer system via CRDs 72 and thus manages the providing log information for processing by the CRDs according to pipeline 94. After processing, log information is provided to output function 96. FIG. 3 illustrates examples of different types of outputs, including a Pravega search, a local storage store, a Grafana Loki storage, or an object scale.

Logging operator 70 watches the custom object resources 72 and takes application-specific actions to make the current state of logging service 80 match the desired state according to pipeline configuration 94. Logging operator 70 automatically handles deployment and configuration of custom object instances, such as CRDs, to provide information needed by components of pipeline 94. Thus, a user who designs pipeline 94 does not need to necessarily understand how each given component of the pipeline is deployed and configured, and how a given component interoperates with a given application. Moreover, logging operator 70 keeps watching the custom object resources 72 throughout the custom object resource's, or resources', whole lifetime(s). Changes to custom object resource 72 may be detected and logging operator 70 can dynamically re-configure the components of the custom object resources as needed to support pipeline components of pipeline 94 as specified at an abstract/generic level by an administrator/user using a user interface.

In an example, assume Fluent-Bit as node agent 82, Fluentd as log collector 84, logs are collected and stored to output Pravega Search 98 for further use. A user/administrator does not necessarily need to deploy and configure components for Fluent-Bit, Fluentd, and Pravega Search when setting up a log service and its data stream pipeline according thereto. Instead, the user only uses a user interface to select generic logging pipeline component. The user interface and logging server, such as logging server 12 shown in FIG. 1, may create a logging custom object resource to implement, or 'build up', logging service 80. The user does not have to install each component of pipeline 94, understand how to bring them up, or implement them. Moreover, a logging custom object resource's template is provided by default to facilitate quick set up an available logging service—pipeline components provided by the logging server can be modified as described elsewhere herein without having to restart the pipeline logging service. When the user creates a pipeline or makes a change to a pipeline, such as adding a filter for log data or changing the output from Pravega Search to Local Store, the user does not have to re-configuration and restart jobs based on the requirements of applications to which the pipelines apply, or the user does not have to configure complex support for multiple pipelines and output. Instead, a user generically creating, or editing, a pipeline flow and its corresponding output is enough to set up a new pipeline or to change an existing pipeline—adding more flows and outputs can provide for multiple pipelines.

Figure 4:
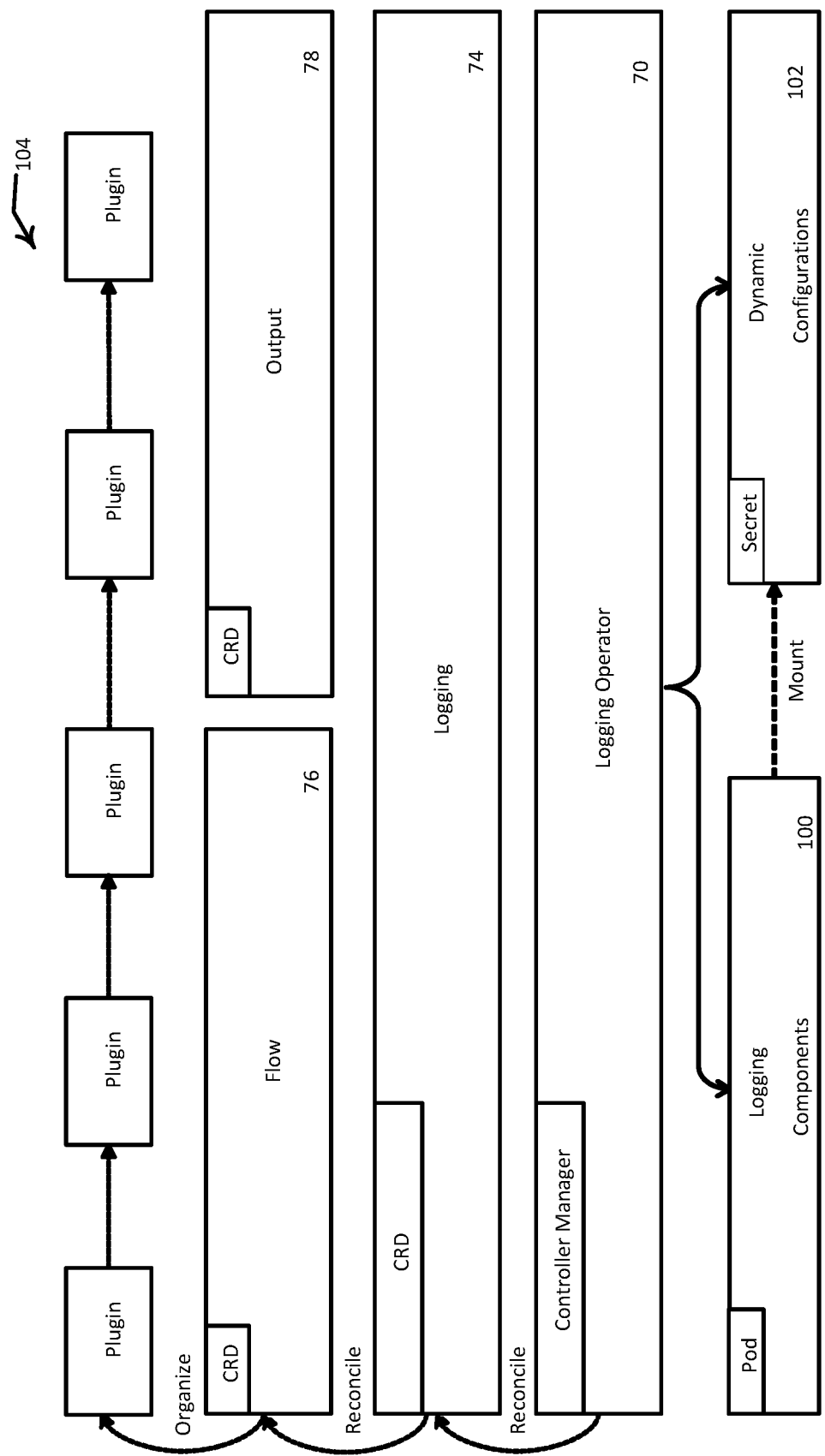
FIG. 4 illustrates a block diagram automating implementation of custom objects.

Turning now to FIG. 4, the figure illustrates a block diagram at an abstract level, not necessarily showing a temporal ordering, of the automating of the translating of custom object instances, for example CRD instances, by logging operator 70 into deployment of physical logging components and configurations. Logging operator 70 interfaces with system POD logging components 100 and may mount dynamic configurations 102 to monitor, or 'watch', application activity and watch for new or updated pipeline functionality requested by a user. A secret may comprise an encoded version of dynamic configuration 102, which has restricted visibility and is only visible to privileged software, for example, logging components. When new or updated pipeline functionality is selected by a user, logging operator 70 manages the creation of, or updating of, custom object instances, such as CRDs, that process log information in ways needed by user-specified pipeline components/plugins. The CRDs may be created or updated without having to restart a POD the CRD is implemented in. Thus, regardless of the state of one or more logging custom objects 74, one or more custom flow objects 76, or one or more custom output objects 78, logging operator 70 interacts with system/application activity and CRDs to obtain log information. The logged information may be provided to the custom objects, or 'reconciled', when the custom objects are active and operating, as requested by customized objects instances 74, 76, and 78, thus translating raw log data obtained from system logging components 100 as directed by the custom object instances. The custom objects may be customized so that they provide information in a format and according to rules that an application requires and that plugin functions, as generically specified by a user of a user interface 10, of pipeline 104 expect or request.

Figure 5:
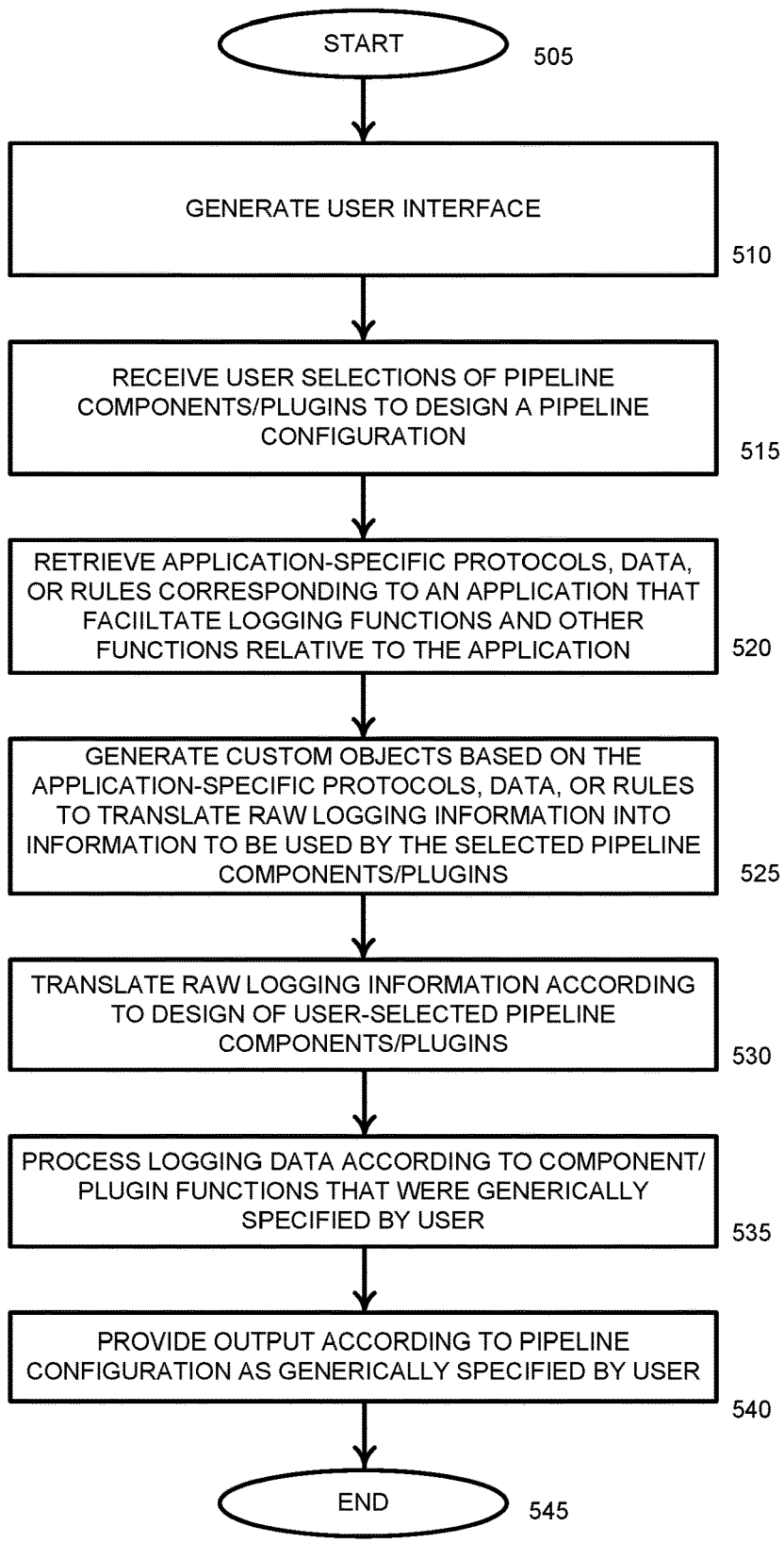
FIG. 5 illustrates a flow diagram of a method to generate or operate pipelines.

Turning now to FIG. 5, the figure illustrates a flow diagram of an embodiment method 500 to generate and operate one or more pipelines, which may be logging pipelines, for one or more corresponding computer applications operating in a computer environment. The computer environment may include an automating software deployment, scaling, and management system, such as for, example Kubernetes. Method 500 begins at step 505. At step 510 a user interface is generated, or provided, such that a user can design a pipeline, such as a logging pipeline. The user interface may be provided by a pipeline management server, which may be, or may not be, managed by a Kubernetes aspect or instance. A user makes selections of generic pipeline components to design a pipeline to control, or manage, one or more functions that may be related to logging of data flowing into or out of an application, logging of data processed by an application, or logging or other activities performed by an application, process, service, instance or other computer component or entity of a given computer system. At step 511 the user's selections are received by the pipeline management server.

Depending on the application, process, service, or computer component to have its activity or data flow monitored and logged, and depending on the functions selected by a user in designing a given pipeline, information corresponding to the selected functionality and the application or other computer entity to be monitored is retrieved from a database, which may be referred to as an application and platform database, or an application and platform data store, at step 520. The application and platform data store may, or may not be, a database, or other data store within a Kubernetes environment. In an embodiment the application and platform may be wholly, or partially, implemented with a Kubernetes etcd data store.

At step 525, the management server instructs and manages the creation of one or more custom object instances. The pipeline management server generates a pipeline configuration according to the user's function/component/plugin selections and instructs the creation of one or more custom object instances, such as CRD instances in a Kubernetes environment. Other environments than Kubernetes may be used instead; the custom object instances may be referred with different terminology in platform environment different than Kubernetes.

The custom object instances may be created from scratch. In an embodiment, the custom object instances may instead begin as default, or basic, object instances that have been preconfigured to perform one or more functions similar to general functionality called for by a user in designing a pipeline. The custom object instance may be modified according to information retrieved from the application and platform data store such that the custom object instance is configured to perform a generic function as specified by a user in creating the pipeline design according to specific parameters, format, or rules that are specific to the computer application, service, process, component, or other computer entity for which logging information is desired. It will be appreciated that the application and platform data store may be manually updated as new software application with new requirements are available. In an embodiment, the application and platform data store may be indexed on a name or identifier of applications, processes, services, components, etc., and when a new such computer entity becomes available to a given computer system, such as an enterprises computer system, the application and platform data store may be automatically updated with changes to parameters, format, rules, etc. for the particular new, or revised, computer entity.

The custom object instances are deployed in an environment, such as a Kubernetes POD, and begin performing functionality for which they were created to perform. At step 530 the custom object instances translate raw information, logging information, for example, which may be received from a computer system logging device, service, or process that existed before the logging pipeline was created as specified by a pipeline configuration and perform functionality according to pipeline functions generically selected by a user at step 535. After the performing logging functionality, as specified by a user in designing a logging pipeline configuration, at step 535, one or more custom object instances may provide output in a form specified by a user in a given pipeline configuration at step 540. Method 500 ends at step 545. It will be appreciated that by using the custom object instances to facilitate functionality specified generically by a user in a pipeline design, the user not only does not need to know or understand the particular protocols, formats, rules, etc. associated with a given application, process, service, component or other computer entity that are stored in the application and platform data store, the user can create multiple logging pipelines for logging of multiple application, processes, services, computer components, etc. because more custom object instances than just those required for a single pipeline can be contained in an environment such as a Kubernetes POD.

Figure 6:
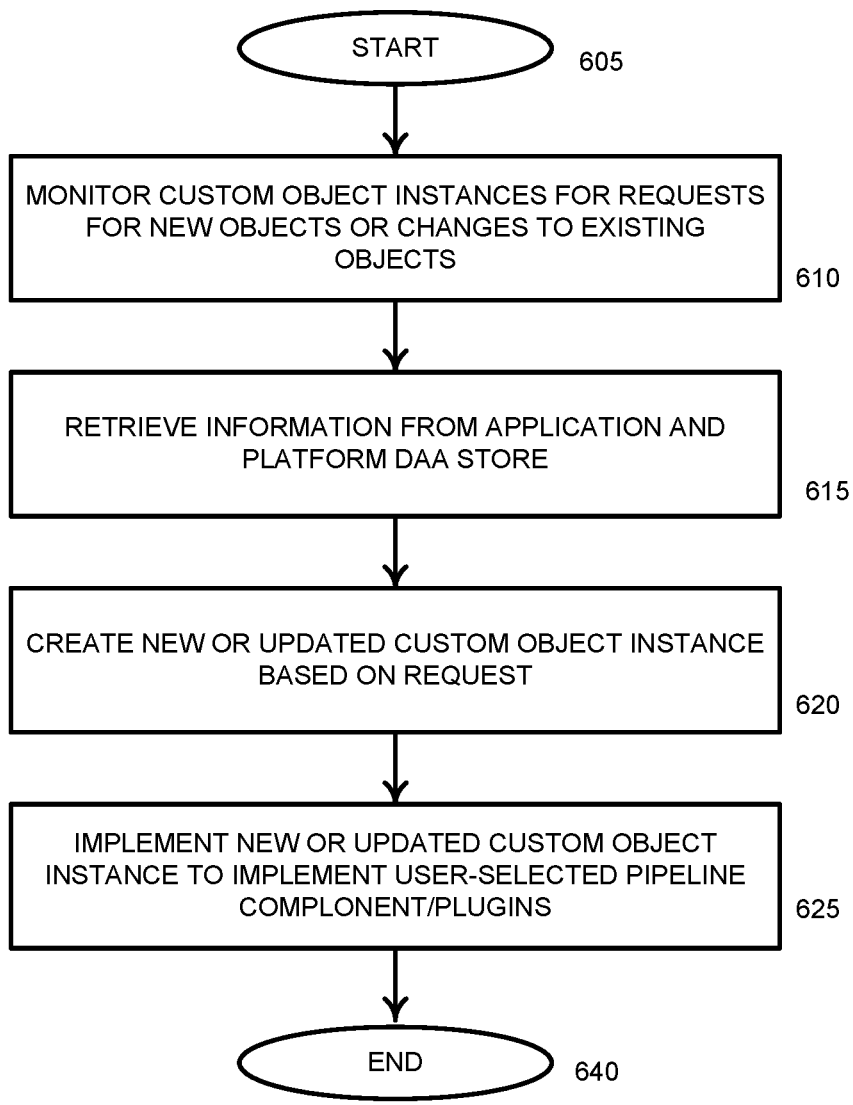
FIG. 6 illustrates a flow diagram of a method to implement dynamic pipeline creation and updating.

Turning now to FIG. 6, the figure illustrates a flow diagram of a method 600 to implement dynamic pipeline creation and updating. Method 600 begins at step 605. At step 610, a logging operator monitors activity, behavior, or changes of one or more custom object instances, such as Kubernetes CRDs. The logging monitor may be implemented as a controller manager, or similar computer instances. The information monitored by the logging monitor may be information stored in a Kubernetes etcd data store, which may store state and configuration information regarding the custom object instances. By storing state and configuration information related to the custom object instances, in an etcd data store, a custom object instance can be updated, changed, or otherwise modified without losing the state information of the object before it is updated. In some embodiments application specific information and pipeline configuration design specifications specified by a user when designing a pipeline configuration may be stored in an etcd data store. Furthermore, this facilitates maintaining operation of other pipelines that may be concurrently running because configuration information related to the other pipelines is maintained in the etcd data store and because revising a given custom object instances does not necessarily require restarting other custom object instances because the Kubernetes POD, or similar computer environment, does not shut down when a custom object instance is updated.

A step 615, information is retrieved from the data store, which may be an etcd data stare as previously discussed. The logging manager, which may work in conjunction with the pipeline management server, updates one or more custom object instances according to protocols, formats, or rules related to an application, process, service, component, or other computer entity of which the activity is to be logged.

At step 620, a new custom object instance or an updated custom object instance is created or updated according to information that may be retrieved from an application and platform data store.

At step 625, a logging operator implements the new or updated custom object instance, or instances, which may operate according to a pipeline configuration design that a user generically designed. Method 600 ends at step 640.

As new software technologies, or new applications that may require different parameters, formats, rules, etc., for providing information that may be logging information, an application and platform component data store may be manually updated with mapping that associates the new or updated application protocols, format, or rules, etc. with a generic logging function. Such manual updating may facilitate automatic generation of custom object instances, for example, Kubernetes CRD instances, which implement translation of raw logging information such that the information is usable to implement user-selected generic pipeline logging components/plugins. The application and platform component database, or data store, may be implemented as part of a platform such as Kubernetes, or may be implemented as part of a database implemented in a different platform.

Figure 7:
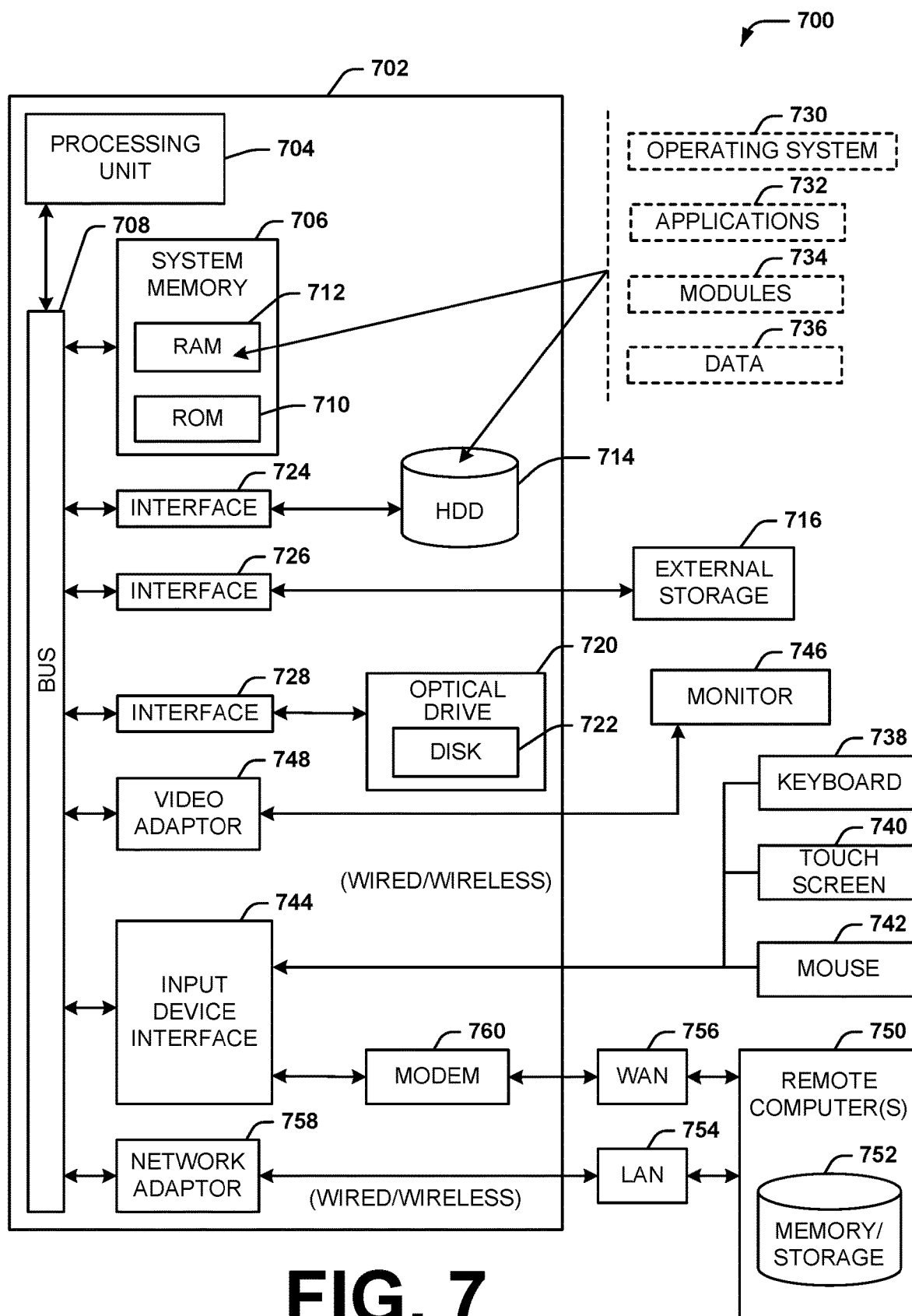
FIG. 7 illustrates a computer environment.

In order to provide additional context for various embodiments described herein, FIG. 7 and the following discussion are intended to provide a brief, general description of a suitable computing environment 700 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 7, the example environment 700 for implementing various embodiments of the aspects described herein includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors and may include a cache memory. Dual microprocessors and other multi-processor architectures can also be employed as the processing unit 704.

The system bus 708 can be any of several types of bus structure that can further interconnect to a memory bus (with or without a memory controller), a peripheral bus, and a local bus using any of a variety of commercially available bus architectures. The system memory 706 includes ROM 710 and RAM 712. A basic input/output system (BIOS) can be stored in a non-volatile memory such as ROM, erasable programmable read only memory (EPROM), EEPROM, which BIOS contains the basic routines that help to transfer information between elements within the computer 702, such as during startup. The RAM 612 can also include a high-speed RAM such as static RAM for caching data.

Computer 702 further includes an internal hard disk drive (HDD) 714 (e.g., EIDE, SATA), one or more external storage devices 716 (e.g., a magnetic floppy disk drive (FDD) 716, a memory stick or flash drive reader, a memory card reader, etc.) and an optical disk drive 720 (e.g., which can read or write from a CD-ROM disc, a DVD, a BD, etc.). While the internal HDD 714 is illustrated as located within the computer 702, the internal HDD 714 can also be configured for external use in a suitable chassis (not shown). Additionally, while not shown in environment 700, a solid-state drive (SSD) could be used in addition to, or in place of, an HDD 714. The HDD 714, external storage device(s) 716 and optical disk drive 720 can be connected to the system bus 708 by an HDD interface 724, an external storage interface 726 and an optical drive interface 728, respectively. The interface 724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 712, including an operating system 730, one or more application programs 732, other program modules 734 and program data 736. All or portions of the operating system, applications, modules, and/or data can also be cached in the RAM 712. The systems and methods described herein can be implemented utilizing various commercially available operating systems or combinations of operating systems.

Computer 702 can optionally comprise emulation technologies. For example, a hypervisor (not shown) or other intermediary can emulate a hardware environment for operating system 730, and the emulated hardware can optionally be different from the hardware illustrated in FIG. 7. In such an embodiment, operating system 730 can comprise one virtual machine (VM) of multiple VMs hosted at computer 702. Furthermore, operating system 730 can provide runtime environments, such as the Java runtime environment or the .NET framework, for applications 732. Runtime environments are consistent execution environments that allow applications 732 to run on any operating system that includes the runtime environment. Similarly, operating system 730 can support containers, and applications 732 can be in the form of containers, which are lightweight, standalone, executable packages of software that include, e.g., code, runtime, system tools, system libraries and settings for an application.

Further, computer 702 can comprise a security module, such as a trusted processing module (TPM). For instance, with a TPM, boot components hash next in time boot components, and wait for a match of results to secured values, before loading a next boot component. This process can take place at any layer in the code execution stack of computer 602, e.g., applied at the application execution level or at the operating system (OS) kernel level, thereby enabling security at any level of code execution.

A user can enter commands and information into the computer 702 through one or more wired/wireless input devices, e.g., a keyboard 738, a touch screen 740, and a pointing device, such as a mouse 742. Other input devices (not shown) can include a microphone, an infrared (IR)

remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 704 through an input device interface 744 that can be coupled to the system bus 708, but can be connected by other interfaces, such as a parallel port, an IEEE 1394 serial port, a game port, a USB port, an IR interface, a BLUETOOTH® interface, etc.

A monitor 746 or other type of display device can be also connected to the system bus 608 via an interface, such as a video adapter 748. In addition to the monitor 746, a computer typically includes other peripheral output devices (not shown), such as speakers, printers, etc.

The computer 702 can operate in a networked environment using logical connections via wired and/or wireless communications to one or more remote computers, such as a remote computer(s) 750. The remote computer(s) 750 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 752 is illustrated. The logical connections depicted include wired/wireless connectivity to a local area network (LAN) 754 and/or larger networks, e.g., a wide area network (WAN) 756. Such LAN and WAN networking environments are commonplace in offices and companies, and facilitate enterprise-wide computer networks, such as intranets, all of which can connect to a global communications network, e.g., the internet.

When used in a LAN networking environment, the computer 702 can be connected to the local network 754 through a wired and/or wireless communication network interface or adapter 758. The adapter 758 can facilitate wired or wireless communication to the LAN 754, which can also include a wireless access point (AP) disposed thereon for communicating with the adapter 758 in a wireless mode.

When used in a WAN networking environment, the computer 702 can include a modem 660 or can be connected to a communications server on the WAN 756 via other means for establishing communications over the WAN 756, such as by way of the internet. The modem 760, which can be internal or external and a wired or wireless device, can be connected to the system bus 708 via the input device interface 744. In a networked environment, program modules depicted relative to the computer 702 or portions thereof, can be stored in the remote memory/storage device 752. It will be appreciated that the network connections shown are example and other means of establishing a communications link between the computers can be used.

When used in either a LAN or WAN networking environment, the computer 702 can access cloud storage systems or other network-based storage systems in addition to, or in place of, external storage devices 716 as described above. Generally, a connection between the computer 702 and a cloud storage system can be established over a LAN 754 or WAN 756 e.g., by the adapter 758 or modem 760, respectively. Upon connecting the computer 702 to an associated cloud storage system, the external storage interface 726 can, with the aid of the adapter 758 and/or modem 760, manage storage provided by the cloud storage system as it would other types of external storage. For instance, the external storage interface 726 can be configured to provide access to cloud storage sources as if those sources were physically connected to the computer 702.

The computer 702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 8:
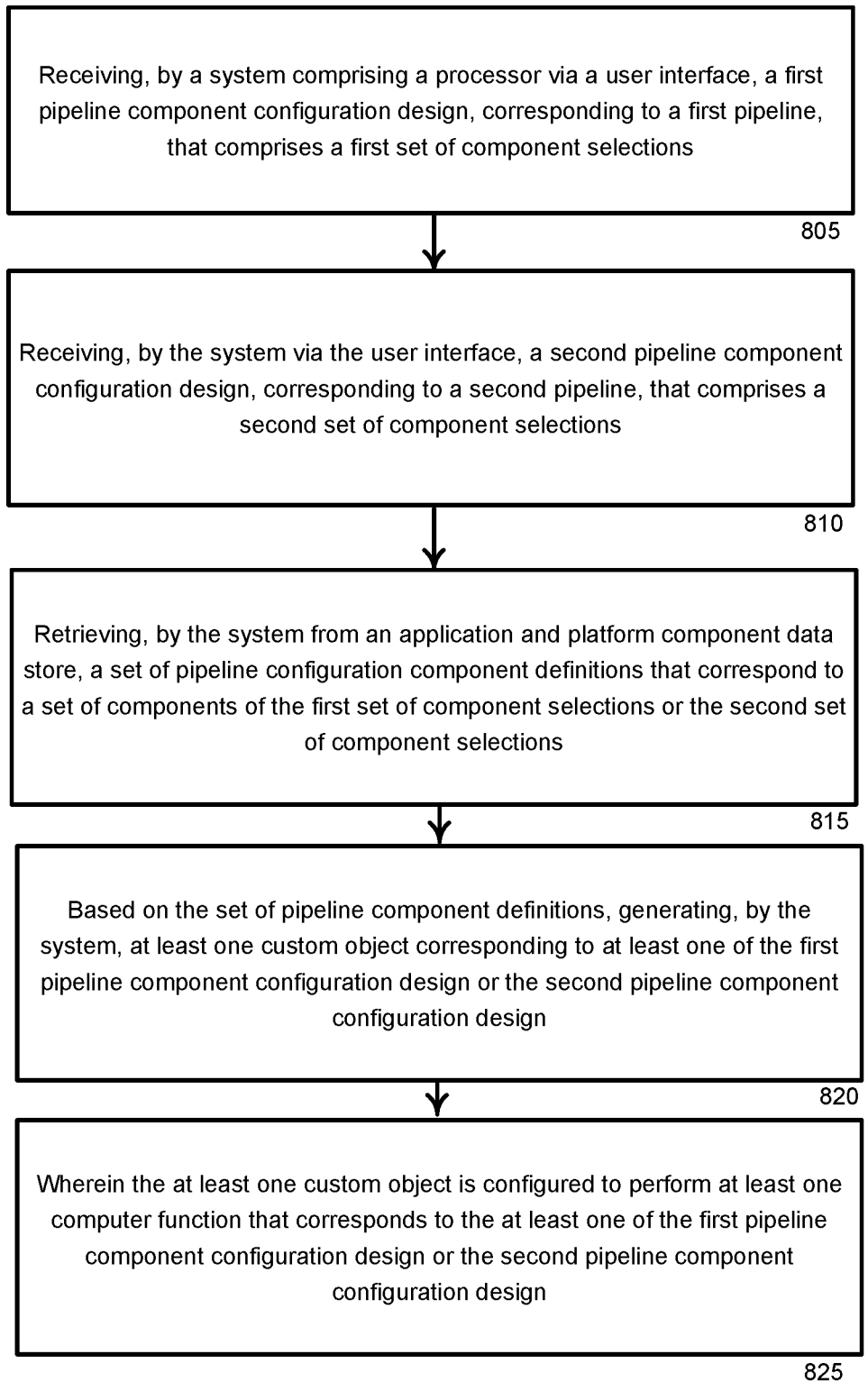
FIG. 8 illustrates a block diagram or a method embodiment.

Turning now to FIG. 8, the figure illustrates a block diagram of a method embodiment 800 that comprises at block 805 receiving, by a system comprising a processor via a user interface, a first pipeline component configuration design, corresponding to a first pipeline, that comprises a first set of component selections and at block 810 receiving, by the system via the user interface, a second pipeline component configuration design, corresponding to a second pipeline, that comprises a second set of component selections. The components may be referred to as logging plugins. At block 815 method 800 comprises receiving from an application and platform component data store, a set of pipeline configuration component definitions that correspond to a set of components of the first set of component selections or the second set of component selections. At block 820, based on the set of pipeline component definitions, method 800 comprises generating, by the system, at least one custom object corresponding to at least one of the first pipeline component configuration design or the second pipeline component configuration design. At block 825 method 800 comprises the at least one custom object being configured to perform at least one computer function that corresponds to the at least one of the first pipeline component configuration design or the second pipeline component configuration design.

Figure 9:
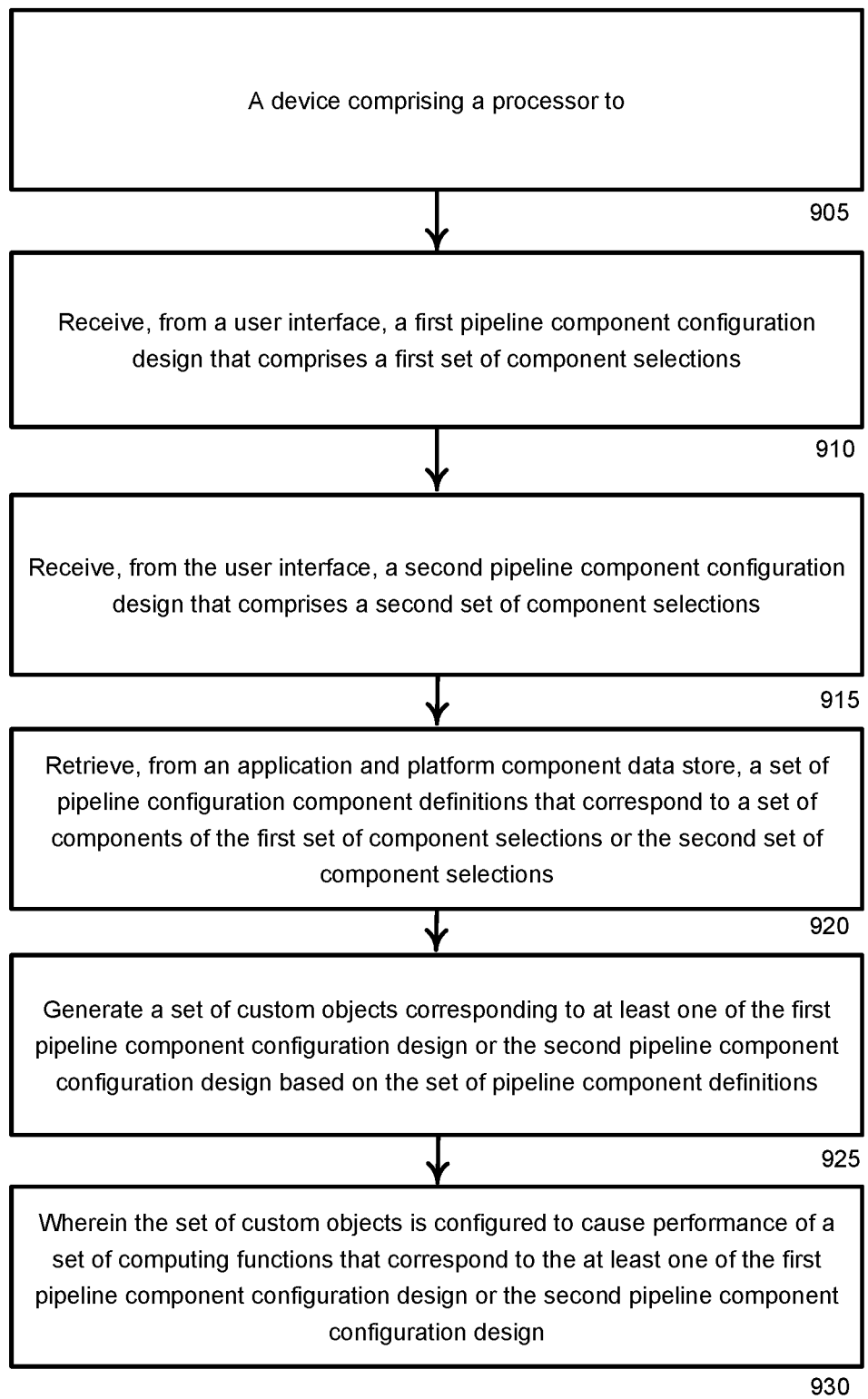
FIG. 9 illustrates a block diagram of a system embodiment.

Turning now to FIG. 9, the figure illustrates a block diagram of an embodiment system 900. System 900 comprises at block 905 a device comprising a processor to at block 910 receive, from a user interface, a first pipeline component configuration design that comprises a first set of component selections; at block 915 to receive, from the user interface, a second pipeline component configuration design that comprises a second set of component selections; at block 920 to retrieve, from an application and platform component data store, a set of pipeline configuration component definitions that correspond to a set of components of the first set of component selections or the second set of component selections; at block 925 generate a set of custom objects corresponding to at least one of the first pipeline component configuration design or the second pipeline component configuration design based on the set of pipeline component definitions, and at block 930 wherein the set of custom objects is configured to cause performance of a set of computing functions that correspond to the at least one of the first pipeline component configuration design or the second pipeline component configuration design.

Figure 10:
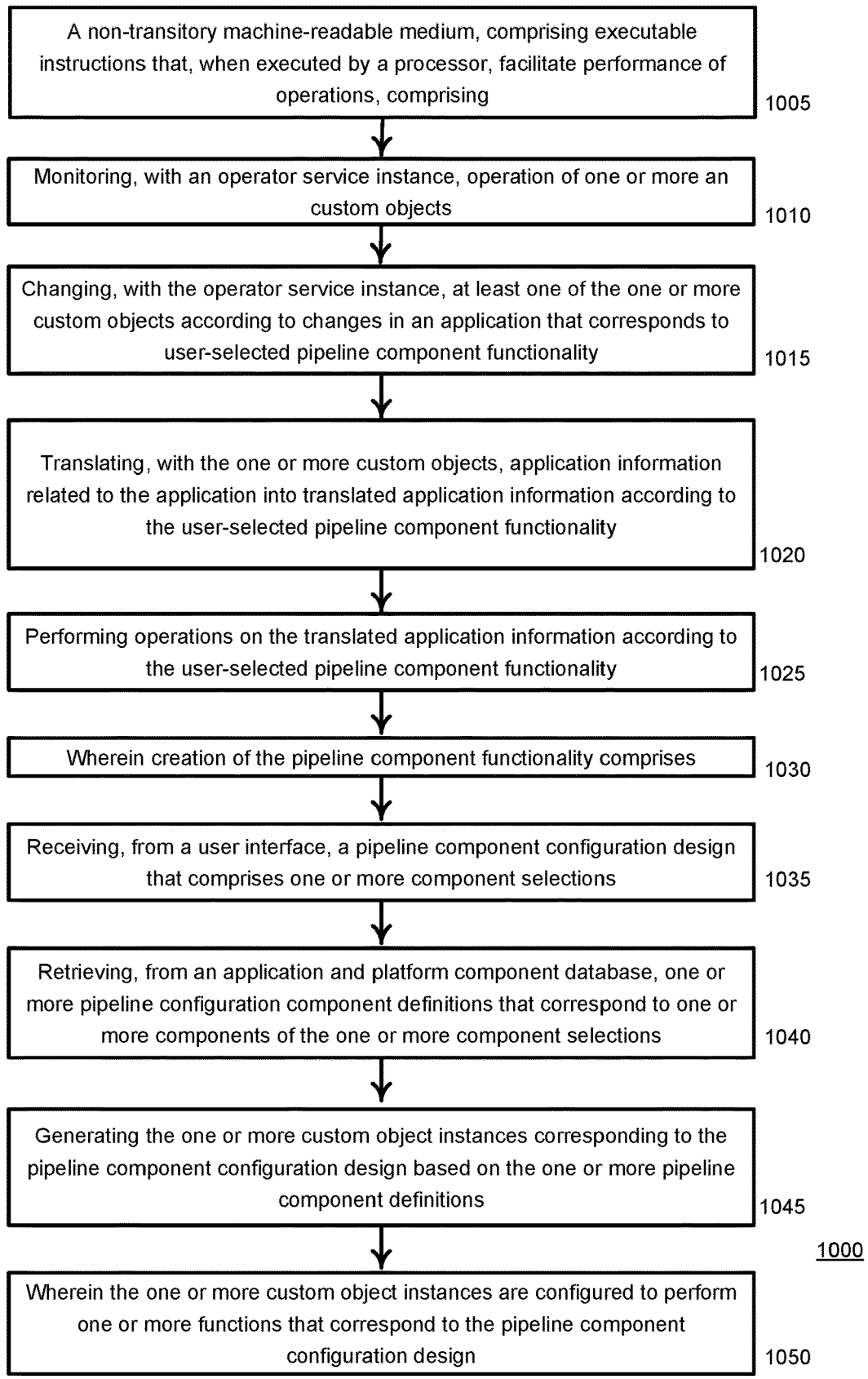
FIG. 10 illustrates a block diagram of a method that may be embodied in machine readable media.

Turning now to FIG. 10, the figure illustrates a block diagram of an embodiment non-transitory machine-readable medium 1000, comprising at block 1005 executable instructions that, when executed by a processor, facilitate performance of operations, comprising at block 1010 monitoring, with an operator service instance, operation of one or more an custom objects; at block 1015 changing, with the operator service instance, at least one of the one or more custom objects according to changes in an application that corresponds to user-selected pipeline component functionality; at block 1020 translating, with the one or more custom objects, application information related to the application into translated application information according to the user-selected pipeline component functionality; at block 1025 performing operations on the translated application information according to the user-selected pipeline component functionality; at block 1030 wherein creation of the pipeline component functionality comprises: at block 1035 receiving, from a user interface, a pipeline component configuration design that comprises one or more component selections; at block 1040 retrieving, from an application and platform component database, one or more pipeline configuration component definitions that correspond to one or more components of the one or more component selections; at block 1045 generating the one or more custom object instances corresponding to the pipeline component configuration design based on the one or more pipeline component definitions, and at block 1050 wherein the one or more custom object instances are configured to perform one or more functions that correspond to the pipeline component configuration design.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

Method steps may be embodied in computer software, firmware, or hardware, and may be implemented by computer code stored on computer readable media.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time, priority, sequence of operation, or preference. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by a system comprising at least one processor via a user interface, a first pipeline component configuration design, of a first pipeline to be used with respect to at least one running application, that comprises at least one first pipeline component;

receiving, by the system via the user interface, a second pipeline component configuration design, of a second pipeline to be used with respect to the at least one running application, that comprises at least one second pipeline component;

retrieving, by the system from an application and platform component data store, at least one first pipeline configuration component definition that defines the at least one first pipeline component and at least one second pipeline configuration component definition that defines the at least one second pipeline component;

based on the at least one first pipeline component definition, generating, by the system, at least one first custom object corresponding to at least one of the at least one first pipeline component and at least one second custom object corresponding to at least one of the at least one second pipeline component;

according to at least one change that occurs with respect to the at least one running application that results in at least one changed running application, changing, by the system, at least one of the at least one first custom object or the at least one second custom object to result in at least one changed custom object; and translating, by the system using the at least one changed custom object, application information, corresponding to the at least one change that occurs with respect to the at least one running application, into translated application information to be usable via the first pipeline or the second pipeline with respect to executing the at least one changed running application, wherein the at least one changed custom object is configured, based on the at least one change, to be usable for implementation, using the translated application information, of at least one function corresponding to at least one of the at least one first pipeline component or the at least one second pipeline component, wherein the first pipeline component configuration design or the second pipeline component configuration design comprises a logging function component, wherein the at least one running application comprises a first application and a second application, wherein the first pipeline component configuration design comprises at least one first function selected from a first group of functions comprising: a first parsing function corresponding to the first application, a first multiline recognition function corresponding to the first application, a first filtering function corresponding to the first application, a first metadata enrichment function configured to receive first metadata from a first container orchestration system server and corresponding to the first application, a first routing function corresponding to the first application, a first external forwarding function corresponding to the first application, or a first log retention function corresponding to the first application, wherein the second pipeline component configuration design comprises at least one second function selected from a second group of functions comprising: a second parsing function corresponding to the second application, a second multiline recognition function corresponding to the second application, a second filtering function corresponding to the second application, a second metadata enrichment function configured to receive second metadata from a second container orchestration system server and corresponding to the second application, a second routing function corresponding to the second application, a second external forwarding function corresponding to the second application, and a second log retention function corresponding to the second application, and wherein at least one of: the first parsing function is different than the second parsing function, the first multiline recognition function is different than the second multiline recognition function, the first filtering function is different than the second filtering function, the first metadata enrichment function is different than the second metadata enrichment function, the first routing function is different than the second routing function, the first external forwarding function is different than the second external forwarding function, or the first log retention function is different than the second log retention function.

2. The method of claim 1, wherein the system comprises a computer platform management software system configured to implement the first pipeline and the second pipeline.

3. The method of claim 1, wherein the at least one custom object comprises instructions usable to perform the at least one computer function that corresponds to the at least one of the first pipeline component configuration design or the second pipeline component configuration design.

4. The method of claim 1, wherein the first pipeline component configuration design is configured to interoperate with respect to the first computer application, wherein the second pipeline component configuration design is configured to interoperate with respect to the second computer application, wherein the second computer application is a different computer application than the first computer application, and wherein the method further comprises updating, by the system, the first pipeline without restarting or refreshing at least one logging component being used by the second pipeline or without refreshing at least one component policy that corresponds to the second pipeline.

5. The method of claim 4, wherein the first pipeline and the second pipeline are configured to concurrently generate respective logging information corresponding to concurrent operation of the first computer application and the second computer application.

6. The method of claim 4, wherein the first pipeline component configuration design or the second pipeline component configuration design comprises an update usable to modify the first pipeline or second pipeline, respectively, resulting in an updated first pipeline or an updated second pipeline, respectively, and wherein a restart of a computer environment, in which the updated first pipeline or the updated second pipeline is operating, does not occur before operation of the updated first pipeline or the updated second pipeline, respectively, begins.

7. A system, comprising:
a device comprising at least one processor to:
receive, from a user interface, a first pipeline component configuration design of a first pipeline;
receive, from the user interface, a second pipeline component configuration design of a second pipeline;
retrieve, from an application and platform component data store, a set of pipeline configuration component definitions that are usable to implement the first pipeline or the second pipeline;
generate a set of custom objects corresponding to at least one of the first pipeline component configuration design or the second pipeline component configuration design based on the set of pipeline component definitions;
according to changes in a running application corresponding to the first pipeline or the second pipeline, change the at least one of the set of custom objects to result in at least one changed custom object; and
translate, with the at least one changed custom object, application information, corresponding to the changes in the running application, into translated application information in a format that is usable by the first pipeline or the second pipeline,
wherein the set of custom objects is configured to cause performance of a set of computing functions that correspond to the at least one of the first pipeline component configuration design or the second pipeline component configuration design,
wherein the running application comprises a first application and a second application, wherein the first pipeline component configuration design comprises at least one first function selected from a first group of functions comprising: a first parsing function corresponding to the first application, a first multiline recognition function corresponding to the first application, a first filtering function corresponding to the first application, a first metadata enrichment function configured to receive first metadata from a first container orchestration system server and corresponding to the first application, a first routing function corresponding to the first application, a first external forwarding function corresponding to the first application, or a first log retention function corresponding to the first application, wherein the second pipeline component configuration design comprises at least one second function selected from a second group of functions comprising: a second parsing function corresponding to the second application, a second multiline recognition function corresponding to the second application, a second filtering function corresponding to the second application, a second metadata enrichment function configured to receive second metadata from a second container orchestration system server and corresponding to the second application, a second routing function corresponding to the second application, a second external forwarding function corresponding to the second application, and a second log retention function corresponding to the second application, and wherein at least one of: the first parsing function is different than the second parsing function, the first multiline recognition function is different than the second multiline recognition function, the first filtering function is different than the second filtering function, the first metadata enrichment function is different than the second metadata enrichment function, the first routing function is different than the second routing function, the first external forwarding function is different than the second external forwarding function, or the first log retention function is different than the second log retention function.

8. The system of claim 7, wherein the first pipeline component configuration design or the second pipeline component configuration design comprises logging function components.

9. The system of claim 7, wherein the set of custom objects comprises instructions for performance of the one or more computing functions that correspond to the at least one of the first pipeline component configuration design or the second pipeline component configuration design.

10. The system of claim 7, wherein the first pipeline component configuration design corresponds to the first application and the second pipeline component configuration design corresponds to the second application, and wherein the second application is a different running application than the first application.

11. The system of claim 10, wherein the first pipeline and the second pipeline, corresponding to the first pipeline component configuration design and the second pipeline component configuration design, respectively, are configured to concurrently generate logging information corresponding to concurrent operation of the first application and the second application, respectively.

12. The system of claim 10, wherein the first pipeline component configuration design or the second pipeline component configuration design comprises a pipeline design update, corresponding to the first pipeline component configuration design or the second pipeline component configuration design, wherein the pipeline design update is to result in an first updated design of the first pipeline component configuration design or a second updated design of the second pipeline component configuration design, respectively, and wherein a restart of a computing environment, with respect to which the first updated pipeline component configuration design or the second updated pipeline component configuration design is applicable, does not occur before the first pipeline or the second pipeline begins operating according to the first updated design or the second updated design.

13. A non-transitory machine-readable medium, comprising executable instructions that, when executed by a processor, facilitate performance of operations, comprising:

monitoring, with an operator service instance, operation of one or more custom objects corresponding to one or more user-selected pipeline component functionalities;

changing, with the operator service instance, at least one of the one or more custom objects according to changes in a running application that corresponds to the one or more user-selected pipeline component functionalities to result in at least one changed custom object;

translating, with the at least one changed custom object, application information, related to the changes in the running application, into translated application information that corresponds to the one or more user-selected pipeline component functionalities, wherein the application information comprises log information corresponding to the running application, and wherein the translated application information comprises the log information in a format usable by the one or more user-selected pipeline component functionalities;

performing at least one pipeline operation with respect to the translated application information according to the one or more user-selected pipeline component functionalities;

wherein creation of the one or more user-selected pipeline component functionalities comprises:

receiving, from a user interface, a pipeline component configuration design that comprises one or more pipeline component selections;

retrieving, from an application and platform component database, one or more pipeline configuration component definitions that correspond to one or more pipeline components of the one or more pipeline component selections; and generating the one or more custom object instances corresponding to the pipeline component configuration design based on the one or more pipeline component definitions, wherein the one or more custom object instances are configured to perform the one or more user-selected pipeline component functionalities, wherein the running application comprises a first application and a second application, wherein the pipeline component configuration design comprises a first pipeline component configuration design comprising at least one first function selected from a first group of functions comprising: a first parsing function corresponding to the first application, a first multiline recognition function corresponding to the first application, a first filtering function corresponding to the first application, a first metadata enrichment function configured to receive first metadata from a first container orchestration system server and corresponding to the first application, a first routing function corresponding to the first application, a first external forwarding function corresponding to the first application, or a first log retention function corresponding to the first application, wherein the pipeline component configuration design comprises a second pipeline component configuration design comprising a second pipeline component configuration design comprising at least one second function selected from a second group of functions comprising: a second parsing function corresponding to the second application, a second multiline recognition function corresponding to the second application, a second filtering function corresponding to the second application, a second metadata enrichment function configured to receive second metadata from a second container orchestration system server and corresponding to the second application, a second routing function corresponding to the second application, a second external forwarding function corresponding to the second application, and a second log retention function corresponding to the second application, and wherein at least one of: the first parsing function is different than the second parsing function, the first multiline recognition function is different than the second multiline recognition function, the first filtering function is different than the second filtering function, the first metadata enrichment function is different than the second metadata enrichment function, the first routing function is different than the second routing function, the first external forwarding function is different than the second external forwarding function, or the first log retention function is different than the second log retention function.

14. The non-transitory machine-readable medium of claim 13, wherein the pipeline configuration comprises a logging component.

15. The non-transitory machine-readable medium of claim 13, wherein the one or more custom object instances are executed in a computing environment.

16. The non-transitory machine-readable medium of claim 15, wherein the computing environment comprises a group of containers of a container orchestration system.

17. The non-transitory machine-readable medium of claim 15, wherein the one or more user-selected pipeline component functionalities are to be updated to one or more updated user-selected pipeline component functionalities, and wherein the computing environment, in which the pipeline configuration executes, is not restarted before the one or more updated user-selected pipeline component functionalities begin operation.

18. The non-transitory machine-readable medium of claim 17, wherein at least one of the first application or the second application is not restarted before the one or more updated user-selected pipeline component functionalities begin operation.

19. The non-transitory machine-readable medium of claim 15, wherein the one or more user-selected pipeline component functionalities are selected via a user interface.

20. The non-transitory machine-readable medium of claim 13, wherein the operator service instance is a controller manager.

* * * * *